S. OLSZEWSKI.
WHEEL.
APPLICATION FILED JUNE 14, 1917.

1,283,877.

Patented Nov. 5, 1918.
2 SHEETS—SHEET 1.

Inventor
SYLVESTER OLSZEWSKI.
By Rahzemond A. Parker
Attorney

S. OLSZEWSKI.
WHEEL.
APPLICATION FILED JUNE 14, 1917.

1,283,877.

Patented Nov. 5, 1918.
2 SHEETS—SHEET 2.

Inventor
SYLVESTER OLSZEWSKI.
By Rahemond A. Parker
Attorney

UNITED STATES PATENT OFFICE.

SYLVESTER OLSZEWSKI, OF DETROIT, MICHIGAN.

WHEEL.

1,283,877.

Specification of Letters Patent.

Patented Nov. 5, 1918.

Application filed June 14, 1917. Serial No. 174,662.

*To all whom it may concern:*

Be it known that I, SYLVESTER OLSZEWSKI, a citizen of the United States, residing at Detroit, county of Wayne, State of Michigan, have invented a certain new and useful improvement in Wheels, and declare the following to be a full, clear, and exact description of the same, such as will enable others skilled in the art to which it pertains to make and use the same, reference being had to the accompanying drawings, which form a part of this specification.

My invention relates to attachment for automobile driving wheels and an object of my improvements is to provide a device that may be conveniently adjusted to and removed from an automobile driving wheel to increase the friction thereof against the road.

I secure this object in the device illustrated in the accompanying drawings in which, Figure 1 is a side elevation of an automobile driving wheel with an apparatus embodying my invention secured thereto.

$a$ is a driving wheel for an automobile and $b$ is the tire thereof. $c$ is the brake drum. The drum $c$ is secured concentric to the wheel $a$ and has an annular groove $c^2$ between the drum and the wheel.

$d$ is a rod bent into an elliptical form at $d^5$ and passing around the brake drum $c$ at its reduced diameter which forms the inner wall of the groove $c^2$. The shape of the part $d^5$ is such that it may have a lateral movement in an approximately horizontal direction, but is restrained from a vertical movement by contact with the wall $d^a$ of the groove $c^2$. Thus, while the rod may reciprocate in an approximately horizontal direction, it is retained in position because of its being in the groove $c^2$ and is restrained from movement vertically. $d^2$ is a part of the rod $d$ bent into a U-shaped loop having parallel parts extending from the part $d^5$ of said rod. $d^3$ is a lug extending upward from the part $d^2$ of the rod $d$ and $d^4$ is a second lug extending from said loop in position to be engaged by a cam as hereinafter described.

$e$ is a metal rod bent in the form of a brake-shoe at $e^2$ $e^2$ and having a part $e^3$ in U-shape having parallel sides extending therefrom. The part $e^3$ of the rod $e$ is of approximately the same shape and length as the part $d^2$ of the rod $d$. These two U-shape portions lie parallel and adjacent to each other and are included within a guide tube $k$.

$e^5$ is a lug extending from the part $e^3$ of the rod $e$ and corresponding to the lug $d^4$. $e^4$ is a second lug extending from the part $e^3$ and corresponding to the part $d^2$ of the rod $d$.

$f$ is a compression spring interposed between the lugs $d^3$ and $e^4$ and acting to force the brake-shoe part $e^2$ toward the tire $b$ of the wheel. The lugs $d^4$ $e^5$ extend through slots in the tube $k$.

$j$ is a part of the chassis of the automobile. $g^2$ is a rod extending at right angles through the side pieces $j$ of the chassis. $g$ is a cam upon the outer end of the rod $g^2$. The cam piece $g$ is so located that it shall engage, when pushed outward, between the lugs $d^4$ and $e^5$ for the purpose hereinafter described. $g^3$ is a bell-crank lever having a slot $g^4$ in one of its arms engaging a pin upon the rod $g^2$ so as to reciprocate said rod. $h$ is a connecting rod and $h^2$ a pedal.

$i$ are chains extending between the side pieces of the part $e^2$ $e^2$ of the rod $e$ and adapted to contact the surface of the tire $b$.

Figure 1:
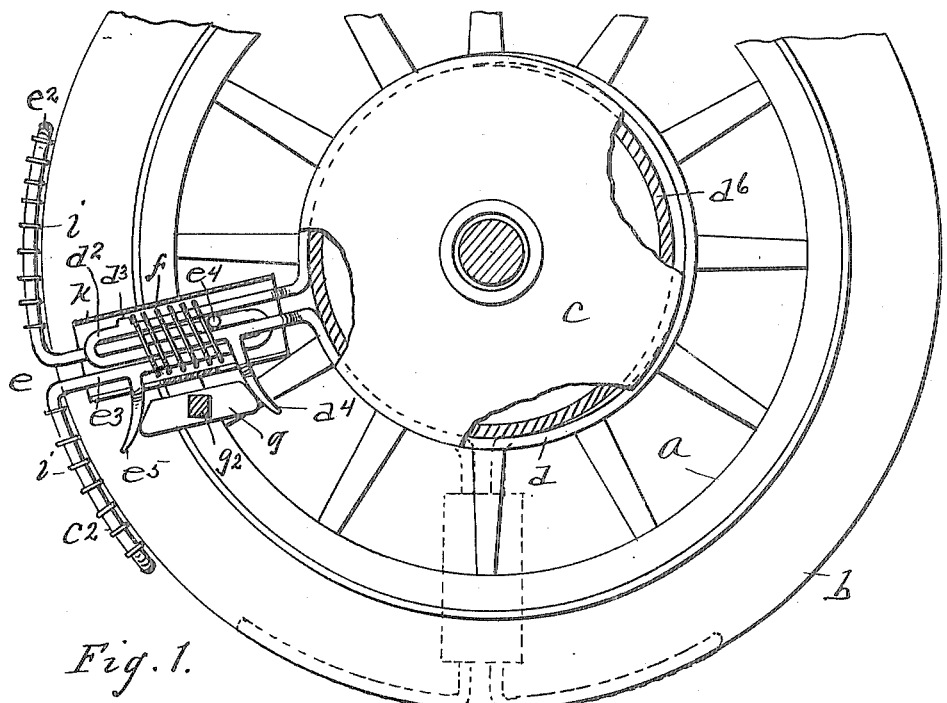

The operation of the above described device is as follows:

In the ordinary operation of the machine the cam $g$ is interposed between the lugs $d^4$ and $e^5$ thus separating said lugs and forcing the parts $e^2$ $e^2$ away from the tire $b$, as shown in Fig. 1, so that the wheel is not interfered with in its motion by the parts $e^2$ and chains $i$ and freeing the part $d^5$ so that it does not rub upon the brake drum.

Figure 2:
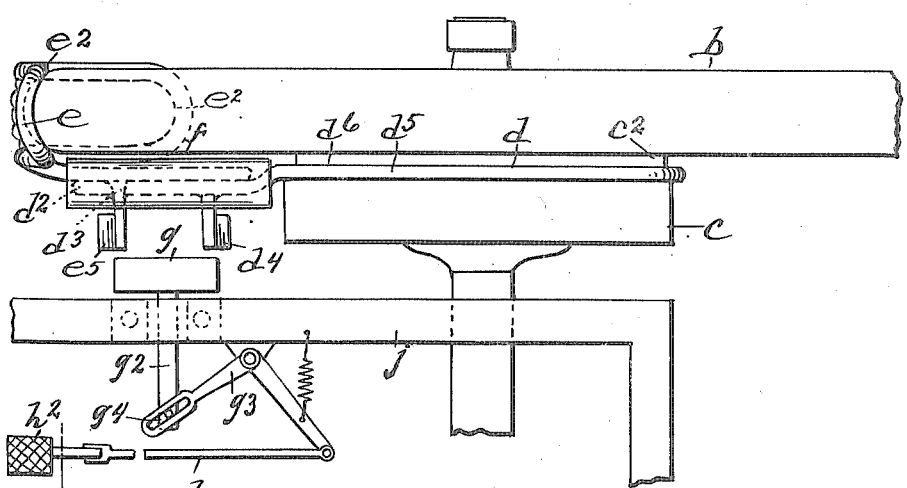
Fig. 2 is a plan view of the same with an adjacent part of the automobile frame and the operating mechanism.
Figure 3:
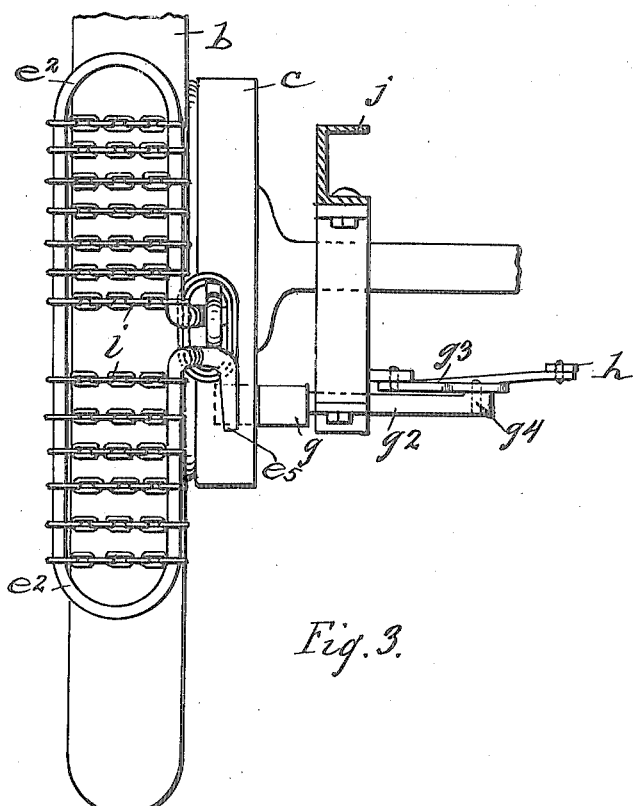
Fig. 3 is an elevation looking from the left of Fig. 1.
Figure 4:
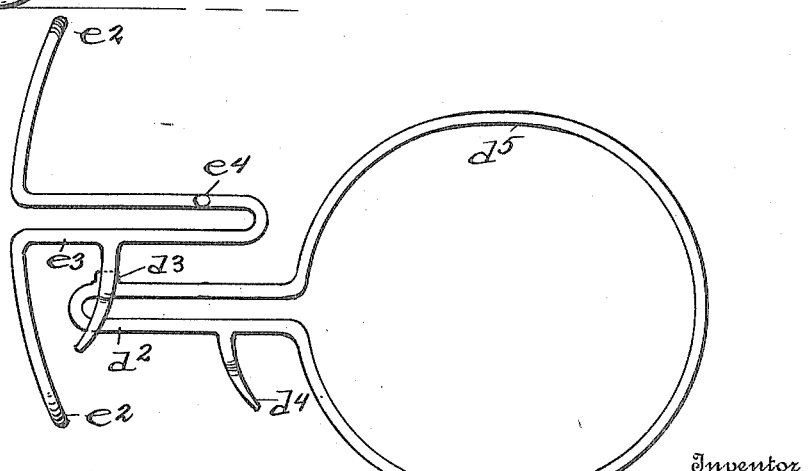
Fig. 4 is a disassembled view of the principal novel parts of the apparatus embodying my invention.

In case the wheel slips, the driver's foot is placed upon the pedal $h^2$ oscillating the bell-crank lever $g^3$ and withdrawing the cam $g$ from between the lugs $d^4$ and $e^5$ as shown in Fig. 2. In this case the spring $f$ forces the brake-shoe part $e^2$ against the tire and the part $e^2$ is carried to the dotted position shown in Fig. 1 where it is interposed between the wheel and the ground and acts to create friction therebetween.

Of course, this device may be used, when the brake is applied, to prevent the wheel from slipping or it may be used in starting, or whenever the wheel slips when being driven by the engine.

In case it is carried by the point of contact between the wheel and the earth, the wheel will simply revolve until it is again brought into position to engage the road bed.

When it is no longer desired to have the friction device engaged with the wheel, the cam $g$ is interposed in the path of the lugs $d^4$ and $e^5$ which lugs then engage the cam forcing the brake-shoe part $e^2$ $e^2$ away from the tire, as shown in Fig. 1, and holding the device in position to be again adjusted to the wheel when required.

What I claim is:

1. In a motor driven vehicle, the combination of a driving-wheel, a device carried by the vehicle and adapted to be applied to the periphery of said wheel and when so applied to prevent slipping of the wheel upon the road bed, means for automatically engaging said device with the periphery of said wheel, and means on said vehicle for disengaging said friction device from said wheel and holding the same.

2. In a motor driven vehicle, the combination of a driving-wheel, a device carried by said wheel and adapted to be applied to the periphery of the same to prevent the slipping of the wheel upon the roadbed, a spring tending to engage said device with the periphery of said wheel, and an adjustable device adapted to be interposed in the line of travel of a portion of the first named device to disengage the latter from the wheel so that said wheel shall revolve independent thereof.

3. In a motor driven vehicle, the combination of a driving-wheel, a device carried by said wheel, a spring tending to engage said friction device with the periphery of said wheel to prevent the slipping of the wheel upon the road bed, and an adjustable device adapted to be interposed in the line of travel of a portion of the first named device to disengage the latter from the periphery of the wheel, and support it in its disengaged position.

4. In a motor driven vehicle, the combination of a driving-wheel, said wheel being provided with a concentric groove, a device engaging in said groove and having a part adapted to be applied to the periphery of the wheel to prevent slipping of the same upon the road bed, and means for reciprocating said engaging part to engage the periphery of the wheel or to separate it therefrom.

5. In a motor driven vehicle, the combination of a driving-wheel, said wheel being provided with a concentric groove, a device engaging in said groove and having a part adapted to be applied to the periphery of the wheel to prevent the slipping of the same upon the road bed, and means for reciprocating said engaging part to engage the periphery of the wheel or to separate it therefrom, and for supporting said friction creating device independent of the wheel when disengaged therefrom.

6. In a motor driven vehicle, the combination of a driving-wheel, said wheel being provided with a concentric groove, a device engaging in said groove and having a part adapted to be applied to the periphery of the wheel to prevent slipping of the same upon the road bed, and means for reciprocating said engaging part to engage the periphery of the wheel or to separate it therefrom, and means for supporting said friction creating device independent of the wheel when disengaged therefrom.

7. In a motor driven vehicle, the combination of a wheel, a brake drum thereon having a reduced diameter forming a groove concentric with said wheel, a friction creating device engaging in said groove so as to be supported by said drum and permitting independent rotation of said drum, a radially reciprocating part of said friction creating device adapted to be engaged and disengaged from the periphery of the wheel, a spring tending to engage said friction producing device with the periphery of the same, a lug extending from the engaging part of said friction producing device, and a cam adapted to be interposed in the line of travel of said lug to disengage said part of the friction producing portion device from the periphery of the wheel.

8. In a motor driven vehicle, the combination of a driving-wheel, a device carried by said vehicle having a part adapted to engage the periphery of said wheel and to be disengaged therefrom, said part being adapted to revolve with said wheel and prevent slipping of the same upon the road bed, and means for engaging and disengaging said part and the periphery of said wheel, said device being so connected with the vehicle that the wheel shall be free to revolve independent of said device, when said part is disengaged from the periphery of said wheel.

9. In a motor driven vehicle, the combination of a driving-wheel, a device carried by said vehicle having a part adapted to engage the periphery of said wheel and to be disengaged therefrom, said part being adapted to revolve with said wheel and prevent slipping of the same upon the road bed, and means for engaging and disengaging said part and the periphery of said wheel, said device being so connected with the vehicle that the wheel shall be free to revolve independent of said device, when said part is disengaged from the periphery of said wheel, and means for supporting said device when said part is disengaged.

10. In a motor driven vehicle, the combination of a wheel, a device having one part secured to said wheel concentric therewith, leaving the wheel free to turn independent thereof, a second part of said device adapted to engage the periphery of said wheel to interpose a part between said wheel and the road bed that shall prevent the slipping of the wheel upon the road bed, a spring interposed between said parts and acting to engage the second part with the periphery of the wheel, and means adapted to engage both of said parts to force them from frictional contact with said wheel.

11. In a motor driven vehicle, the combination of a driving-wheel, a device adapted to prevent slipping between said wheel and the road bed carried by the vehicle and adapted to be applied to the periphery of the wheel and revolve therewith, and means operable from the operator's seat for engaging said device with the periphery of the wheel, said wheel being free to revolve independent of said device when the latter is not applied to the periphery thereof.

12. In a motor driven vehicle, the combination of a driving-wheel, a friction device adapted to prevent slipping between said wheel and the road bed carried by the vehicle and adapted to be applied to the periphery of the wheel and revolve therewith, and means operable from the operator's seat for engaging said device with the periphery of the wheel and disengaging it from the wheel.

In testimony whereof, I sign this specification.

SYLVESTER OLSZEWSKI.